(12) United States Patent
Duong et al.

(10) Patent No.: US 7,349,422 B2
(45) Date of Patent: Mar. 25, 2008

(54) PROVIDING CONTENTION FREE QUALITY OF SERVICE TO TIME CONSTRAINED DATA

(75) Inventors: Francis Duong, Bellevue, WA (US); Abhishek Abhishek, Woodinville, WA (US); Arun Ayyagari, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1059 days.

(21) Appl. No.: 10/453,306

(22) Filed: Jun. 3, 2003

(65) Prior Publication Data
US 2004/0246937 A1 Dec. 9, 2004

(51) Int. Cl.
H04L 12/413 (2006.01)

(52) U.S. Cl. .................................................. 370/447

(58) Field of Classification Search ................ 370/229, 370/230, 230.1, 231, 235, 236, 310, 312, 370/329, 336, 337, 345, 346, 347, 395.21, 370/431, 432, 437, 442, 443, 444, 447, 458, 370/459, 461, 462
See application file for complete search history.

(56) References Cited

U.S. PATENT DOCUMENTS

| 6,909,723 B1 * | 6/2005 | Yonge et al. ............... 370/447 |
| 7,027,462 B2 * | 4/2006 | Benveniste ................. 370/447 |
| 7,095,754 B2 * | 8/2006 | Benveniste ................. 370/465 |
| 2002/0105970 A1 * | 8/2002 | Shvodian .................... 370/468 |
| 2002/0159418 A1 * | 10/2002 | Rudnick et al. ............ 370/338 |

OTHER PUBLICATIONS

Evaluation of Quality of Service Schemes for IEEE 802.11 Wireless LANs Anders Lindgren, Andreas Almquist, Olov Schelen, Division of Computer Science and Networking Department of Computer Science and Electrical Engineering 2001 IEEE, pp. 348 to 351.
Design of a Link Control Protocol for Multimedia Services in Wireless Local Communication Anirban Roy and Pallapa Venkataram 2001 Kluwer Academic Publishers pp. 247-274.

* cited by examiner

Primary Examiner—Seema S. Rao
Assistant Examiner—Christine Duong
(74) Attorney, Agent, or Firm—Workman Nydegger

(57) ABSTRACT

The principles of the present invention provide for providing contention free quality of service to wireless stations. A station indicates to an access point that higher priority data (e.g., time constrained data) is to be sent to the access point. The access point receives the indication and selects a slot time for the station based on the number of other stations that have also indicated higher priority data. A slot time is selected such that the station can check for access to a common wireless link before any stations with lower priority data (e.g., data without time constraints). The access point sends the selected slot time to the station and the station receives the slot time. When the station receives an indication that an application has higher priority data to send, the station checks the common wireless link for availability at the selected slot time.

31 Claims, 4 Drawing Sheets

PROVIDING CONTENTION FREE QUALITY OF SERVICE TO TIME CONSTRAINED DATA

BACKGROUND OF THE INVENTION

1. The Field of the Invention

The present invention relates to wireless networks, and more specifically, to providing contention free quality of service to wireless stations.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form both wired and wireless computer networks over which the computer systems can communicate electronically to share data. As a result, many tasks performed at a computer system (e.g., voice communication, accessing electronic mail, electronic conferencing, web browsing) include electronic communication with one or more other computer systems via wired and/or wireless computer networks.

For example, a number of computer systems can be coupled to a data hub through corresponding wired connections (e.g., category 5 cable) to form a wired network (e.g., an Ethernet segment). Similarly, a number of wireless computer systems (commonly referred to as "stations") can be coupled to a wireless access point ("AP") through corresponding wireless connections (e.g., resulting from appropriate communication between radio transmitters and receivers) to form a wireless network (e.g., an IEEE 802.11 network). Further, a data hub and/or an AP can be connected to other data hubs, AP's, or other network devices, such as routers, gateways, and switches to form more complex networks (including both wired and wireless connections).

When computer systems communicate electronically, electronic data will often pass through a protocol stack that performs operations on the electronic data (e.g., packetizing, routing, flow control). The Open System Interconnect ("OSI") model is an example of a networking framework for implementing a protocol stack. The OSI model breaks down the operations for transferring electronic data into seven distinct "layers," each designated to perform certain operations in the data transfer process. While protocol stacks can potentially implement each of the layers, many protocol stacks implement only selective layers for use in transferring electronic data across a network.

When data is received from a network it enters the physical layer and is passed up to higher intermediate layers and then eventually received at an application layer. The physical layer, the lower most layer, is responsible for converting electrical impulses, light, or radio waves into a bit stream and vice versa. On the other hand, when data is transmitted from a computing system, it originates at the application layer and is passed down to intermediate lower layers and then onto a network. The application layer, the upper most layer, is responsible for supporting applications and end-user processes, such as, for example, electronic conferencing software, electronic mail clients, web browsers, etc.

An intermediate layer incorporated by most protocol stacks is the Data Link layer. The Data Link layer decodes data packets (received from higher layers) into bit streams for use by the physical layer and encodes bit steams (received from the physical layer) into data packets for use by higher layers. A sub-layer typically included in the Data Link layer is the Media Access Control ("MAC") layer, which implements protocols for moving data packets onto a shared channel (e.g., an Ethernet segment or an IEEE 802.11-channel). Carrier Sense Multiple Access with Collision Detection (usually known as "CSMA/CD") is a MAC layer protocol commonly used with wired Ethernet.

A computer system implementing a CSMA protocol senses a medium (e.g., a wired Ethernet segment) before transmitting data onto the medium. When the medium is sensed busy (i.e., when another computer system is transmitting), the computer system defers its transmission to a later time. On the other hand, when the medium sensed free the computer system is allowed to transmit. While CSMA protocols can be quite effective, there is always some chance that two (or more) computer systems simultaneously sense the medium as being free and transmit data at the same time. On wired Ethernet segments a collision is recognized by transmitting computer systems, which then go into a retransmission phase. During the retransmission phase, each transmitting computer system that detected a collision waits a random amount of time before attempting to retransmit (e.g., as part of on an exponential random backoff algorithm). This reduces the likelihood of the computer systems attempting to retransmit at the same time.

While these collision detection mechanisms are beneficial on wired networks, their usefulness on wireless networks is limited. This is due at least in part to there being no guarantee that all stations communicating with an AP are able to also communicate with each other. For example, a first wireless station may be physically located near the range limit of the AP and a second wireless station may be physically located 180 degrees from the first station also near the range limit of the AP. Accordingly, while both stations are within range of the AP they may be out of range of each other. Thus, there is a possibility that the first station detects a wireless channel as free when in fact the second station is transmitting data on the wireless channel. If the first station were to transmit data it would collide with the data from the second station resulting in corruption of data from both stations. Further, as the number of stations communicating with an AP increases, so does chance of collisions due to a number of stations being unable to communicate with each other.

Accordingly, computer systems on a wireless network may implement the Distributed Coordination Function ("DCF") to attempt to reduce data collisions. DCF implements collision avoidance by requiring a station to sense a channel as being available for a DCF Inter Frame Space ("DIFS") time (34 microseconds for 802.11a) plus a random interval of time. When a station senses that a wireless channel is free for DIFS plus the random interval, the station can transmit data. Typically, the random interval is varied among different stations. Thus, a station with a lower random interval may sense a wireless channel is free and begin to transmit data, before a station with a higher random interval senses the wireless channel. Further, even if some stations are configured with the same random interval, there is still a reduced chance that at any given time multiple stations having data to send will have the same random interval.

Some types of data, such as, for example, Voice over Internet Protocol ("IP") and streaming video data, are time bounded. That is, if not delivered within a certain amount of time, the value of these types of data is reduced. For example, displaying ten frames of streaming video data every second (as opposed to 60 frames per second) would significantly degrade the usefulness of the streaming video data. On the other hand, other types of data, such as, for example, file transfer data and Web page data, have reduced time constraints. That is, delivery of these other types of data can tolerate some time delay without significantly affecting the usefulness of the data. For example, whether it takes 10 seconds or 20 seconds to present a Web page, the content of the Web page is still eventually presented. Accordingly, when time bounded data and data with reduced time constraints are both contending for media access, it may be appropriate to give preference to the time bounded data.

Unfortunately, DCF makes no distinction between different types of data and as such cannot give preference to particular types of data. Thus, each type of data equally contends with all other types of data for wireless medium access. Depending on DCF random intervals, data with reduced time constraints may be given access to a wireless medium before time bounded data. When data with reduced time constraints is given wireless medium access before time bounded data, the time bound data can be significantly degraded while providing little, if any, benefit to the data with reduced time constraints. Accordingly, some mechanisms have been developed to prioritize data and give a statistical preference to data based on the type of data.

Enhanced DCF ("EDCF") is one mechanism for prioritizing and giving some preference to particular types of data. When an application is to send data, the application indicates a data priority to APIs that interface with the Data Link Layer. The APIs assign the data to one of eight queues, each corresponding to a particular priority. EDCF implements collision avoidance by requiring a station to sense a channel as being available for an Arbitration Inter Frame Space ("AIFS") time plus a random interval of time. When a station senses that a wireless channel is free for AIFS plus the random interval, the station can transmit data. EDCF gives a statistical advantage to higher priority queues by assigning lower AIFS times to higher priority queues. Since higher priority queues have lower AIFS times, there is an increased chance of a higher priority queue at one station checking for wireless medium access (and being given access to the wireless medium) before a lower priority queue at another station.

Implementations of EDCF can assign time bounded data to higher priority queues, while assigning data with reduced time constraints to lower priority queues. Thus, higher priority data has an increased probability of being given wireless medium access before lower priority data. However, there is still some chance (due to the random time interval) that higher priority data at one station with have to contend with lower priority data at another station. That is, there is a chance that lower priority data will be given wireless medium access before higher priority data. Further, when two stations have data of the same priority, EDCF is essentially no different than DCF. Therefore systems, methods, and computer program products for providing contention free quality of service to time constrained data would be advantageous.

BRIEF SUMMARY OF THE INVENTION

The foregoing problems with the prior state of the art are overcome by the principles of the present invention, which are directed towards methods, systems, and computer program products for providing contention free quality of service to higher priority data (e.g., time constrained data).

A number of stations communicate over a common wireless link with an access point. Each of the stations can transfer data of varied priorities to the access point. For example, stations can transfer data with more restrictive time constraints (e.g., voice over Internet Protocol ("IP") data and streaming video) that are assigned higher priorities and data with less restrictive time constraints (e.g., file transfer data and Web page data) that are assigned lower priorities. Some of the stations can be configured to support the principles of the present invention, while other stations are not configured to support the principles of the present invention.

A station sends an indication to the access point that the station can potentially send higher priority data over the common wireless link to the access point. For example, the station can send an indication to the access point that the station is to send voice over IP data. In response to receiving the indication, the access point selects a slot time interval when the station can check for access to the common wireless link. The slot time can be selected such that the station does not have to contend with lower priority data from other stations.

A time interval can be calculated based on the number of stations supported by the access point and the amount of time between the end of a short inter frame space ("SIFS") and the beginning of a contention widow for lower priority data. For example, the time interval can be set equal to the quotient of the time between the end of a SIFS and the beginning of a contention widow divided by the number of supported stations. Each station that indicates higher priority data can potentially be sent is allocated a slot time, which is a multiple of the time interval. For example, if the time interval is 1 millisecond, the first station to indicate high priority data is sent a slot of 1 millisecond, the second station to indicate high priority data is sent a slot of 2 milliseconds, etc. (However, slot times can be re-assigned based on the type of data a station is to send). Accordingly, even when the number of stations indicating higher priority data is equal to the number of supported stations, each station is assigned a slot time that will occur before any station with lower priority data checks the common wireless link for availability (i.e., before the beginning of a contention window).

The access point sends the slot time to the station and the station receives the slot time from the access point. Subsequently, the station receives an indication from an application that the application has higher priority data to send to the access point. The station checks the common wireless link at the received slot time to determine if the common wireless link is available. When the common wireless link is available at the received slot time, the station transmits the higher priority data. On the other hand, when the common wireless link not available at the received slot time (e.g. when another station with a previous slot time is transmitting higher priority data), the station defers the transmission of the higher priority data.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
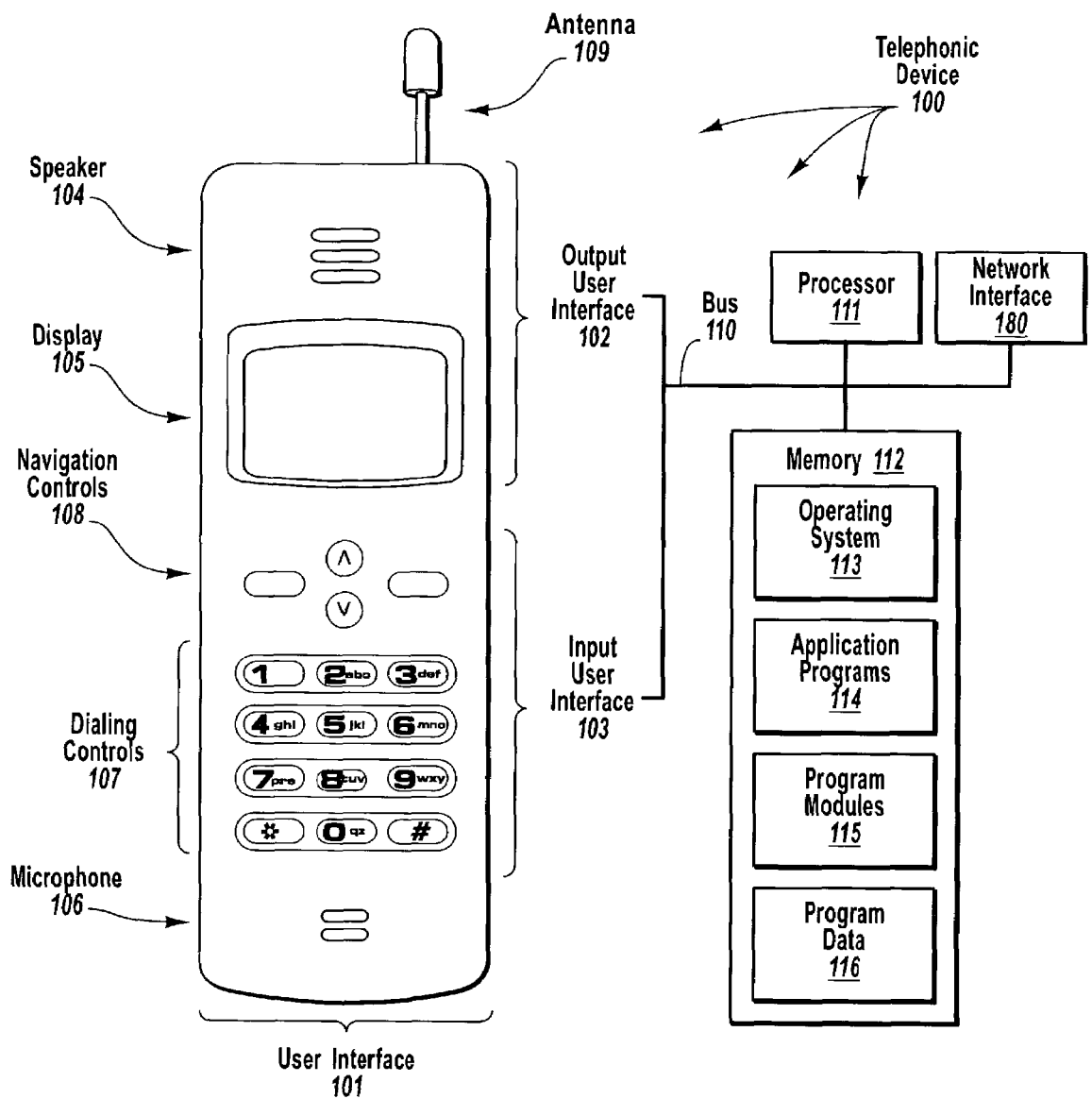
FIG. 1 illustrates a suitable operating environment for the principles of the present invention.

The principles of the present invention provide contention free quality of service to higher priority data, such as, for example, time constrained data. A number of stations communicate over a common wireless link with an access point. The access point assigns slot times to stations that indicate a potential for sending higher priority to the access point. Slot times are calculated such that each slot time occurs before any station with lower priority data checks the common wireless link for availability (i.e., before a contention window). When an application at a station indicates that higher priority data is to be sent to the access point, the station checks the common wireless link at the assigned slot time to determine if the common wireless link is in use. If the common wireless link is not in use at the received slot time, the station transmits the higher priority data. On the other hand, if the common wireless link is in use at the received slot time (e.g., when another station with a lower slot time is transmitting higher priority data), the station defers the transmission of the higher priority data. Accordingly, since all slot times occur before contention windows corresponding to lower priority data, higher priority data can be sent before stations with lower priority data even check the common wireless link for availability.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data which cause a general-purpose computer system or special-purpose computer system to perform a certain function or group of functions. The computer-executable or computer-readable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a processor and memory) work together to perform operations on electronic data.

Those skilled in the art will appreciate that the invention may be practiced in network computing environments with many types of computer system configurations, including hubs, routers, wireless access points ("APs"), wireless stations, personal computers, laptop computers, hand-held devices, multi-processor systems, microprocessor-based or programmable consumer electronics, network PCs, mini-computers, mainframe computers, mobile telephones, PDAs, pagers, and the like. The invention can also be practiced in distributed system environments where local and remote computer systems, which are linked (either by hardwired, wireless, or a combination of hardwired and wireless connections) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a telephonic device 100. Telephonic device 100 includes a user interface 101 for allowing a user to input information through an input user interface 103, and review information presented at an output user interface 102. For example, the output user interface 102 includes a speaker 104 for presenting audio information to the user, as well as a display 105 for presenting visual information to the user. Although not required, telephonic device 100 may also have an antenna 109.

The input user interface 103 may include a microphone 106 for inputting audio information into telephonic device 100. In addition, the input user interface 103 includes dialing controls 107 represented by 12 buttons through which a user may enter information. Input user interface 103 also includes navigation control buttons 108 that assist the user in navigating through various entries and options listed on display 105.

Although the user interface 101 has the appearance of a mobile telephone, the unseen features of the user interface 101 may allow for complex and flexible general-purpose processing capabilities. For example, the telephonic device 100 also includes processor 111, network interface 180, and memory 112 that are connected to each other and to the user interface 101 via system bus 110. The memory 112 generally represents a wide variety of volatile and/or non-volatile memories and may include types of memory previously discussed. However, the particular type of memory used in the telephonic device 100 is not important to the present invention. Program code means comprising one or more program modules may be stored in memory 112. The one or more program modules may include an operating system 113, one or more application programs 114, other program modules 115, and program data 116.

Telephonic device 100 is connectable to networks, such as, for example, an office-wide or enterprise-wide computer network, an intranet, and/or the Internet. Telephonic device 100 can wirelessly exchange data with external sources, such as, for example, remote computer systems and/or remote databases over such a network. Telephonic device 100 includes network interface 180 that can, when appropriate, interoperate with antenna 109 to receive data from external sources and/or transmit data to external sources.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

For example, embodiments of the present invention may also be practiced with a laptop computer. The laptop computer can include a user input interface that receives information from an input device such as, for example, a keyboard, microphone, or mouse. The laptop computer can also include a video output interface that provides a video output signal to an integrated or external video display device, such as, for example, a color or monochrome computer monitor. The laptop computer can also include an audio output interface that provides an audio output signal to external audio output devices, such as, for example, speakers.

The laptop computer can also include a magnetic hard disk drive for reading from and writing to a magnetic hard disk. A magnetic hard disk drive and magnetic hard disk can provide nonvolatile storage of computer-executable instructions, data structures, program modules, and other data for the laptop computer. For example, a magnetic hard disk can store one or more program modules including an operating system, application programs, and program data.

The laptop computer can be connectable to networks, such as, for example, an office-wide or enterprise-wide computer network, an intranet, and/or the Internet. The laptop computer can wirelessly exchange data with external sources, such as, for example, remote computer systems and/or remote databases over such a network. The laptop computer can include a network interface, through which the laptop computer receives data from external sources and/or transmits data to external sources.

Modules of the present invention, as well as associated data, may be stored and accessed from any of the computer-readable media associated with telephonic device 100 (or a laptop computer). For example, portions of such modules and portions of associated program data may be included in operating system 113, application programs 114, program modules 115, and/or program data 116, for storage in system memory 112. When a mass storage device, such as, for example, a magnetic hard disk, is coupled to telephonic device 100 (or a laptop computer), such modules and associated program data may also be stored at the mass storage device. In a networked environment, program modules depicted relative to telephonic device 100, or portions thereof, can be stored in remote memory storage devices, such as, for example, system memory and/or mass storage devices associated with a remote computer system. Execution of such modules may be performed in a distributed environment as previously described.

Figure 2:
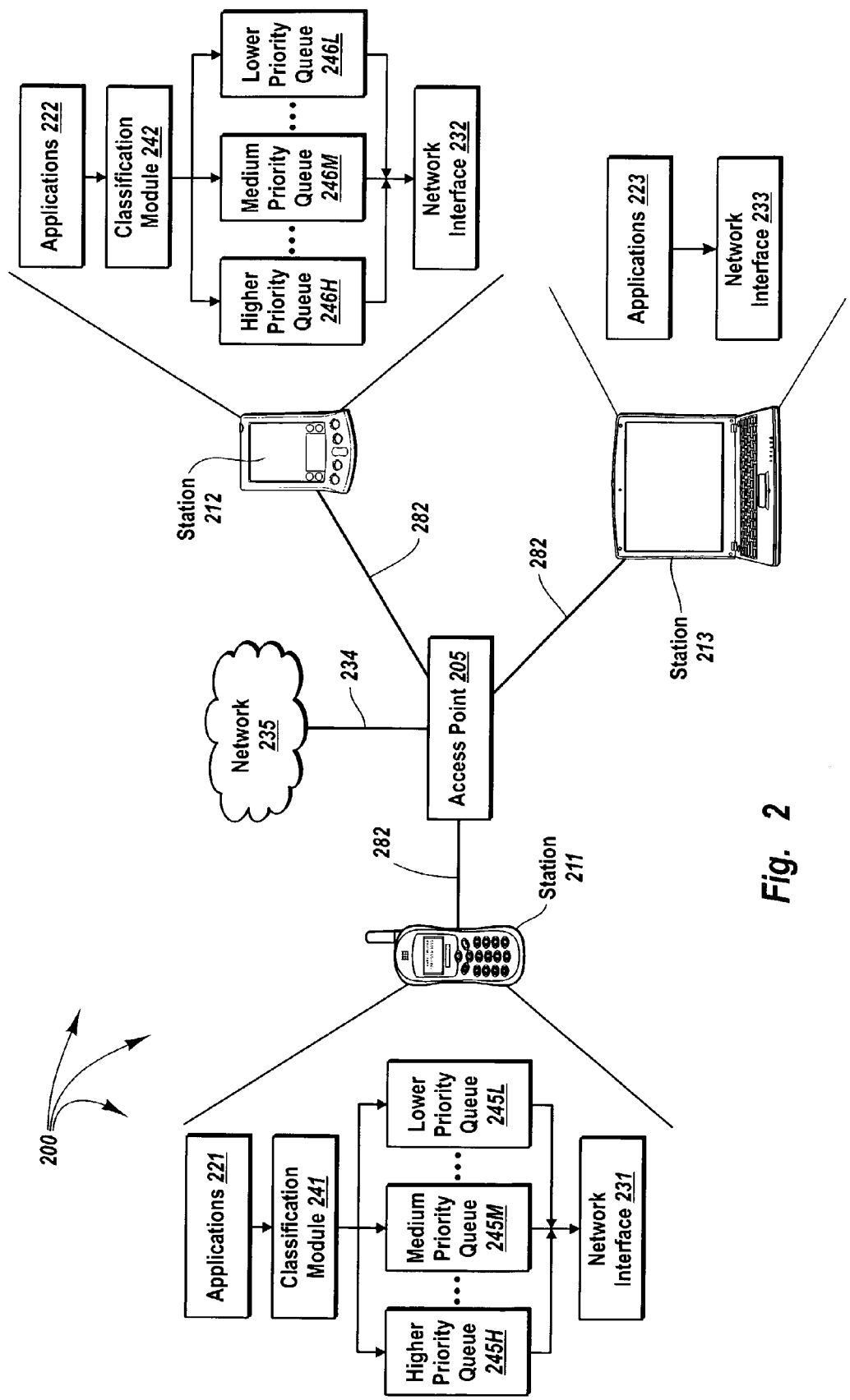
FIG. 2 illustrates an example network architecture that facilitates providing contention free quality of service to higher priority data in accordance with the principles of the present invention.

FIG. 2 illustrates an example network architecture 200 that facilitates providing contention free quality of service to higher priority data in accordance with the principles of the present invention. Network architecture 200 includes stations 211, 212, and 213 that are connected to access point 205 by common wireless link 282. Access point 205 is also connected to network 235 via link 234. Link 234 can be a wired or wireless link that connects access point 205 to other network devices, such as, for example, other access points, routers, hubs, etc., included in network 235. Network 235 can be virtually any type of network, such as, for example, a local area network, a wide area network or even the Internet.

Some of the stations in network architecture 200, such as, for example, stations 211 and 212, can be capable of classifying data based on the type of the data (hereinafter referred to as "data classification enabled stations"). Data classification enabled stations can include a classification module that detects packet types associated with different types of data. When an application indicates that data is to be sent to an access point, a corresponding classification module can receive data packets corresponding to the data and detect the type of the data packets. For example, stations 211 and 212 include classification modules 241 and 242 respectively, which can detect packet types corresponding to data that is to be sent from applications 221 and 222 respectively.

Based on a detected packet type, a classification module at least estimates a classification, such as, for example, as voice over IP data, streaming data, file transfer data, or Web page data, etc., that the application is to send. For example, when a classification module detects a Real Time Streaming Protocol ("RTSP") packet, the classification module may classify the data contained the RTSP packet as streaming video and/or audio data. A classification module can assign data to a queue based at least in part on the restrictiveness of time constraints associated with the data. For example, a classification module can assign data with more restrictive time constraints, such as, for example, voice over IP data or streaming video, to a queue with a higher priority. On the other hand, the classification module can assign data with less restrictive time constraints, such as, for example, file transfer data or Web page data, to a queue with a lower priority.

Accordingly, classification module 241 may assign voice over IP data to higher a priority queue 245H and file transfer data to lower priority queue 245L. Data with less restrictive time constraints than voice over IP data and with more restrictive time constraints than file transfer data (e.g., streaming video) may be assigned to medium priority queue 245M. Similarly, depending at least in part on the restrictiveness of time constraints, classification module 242 can assign data to higher priority queue 246H, medium priority queue 246M, or lower priority queue 246L. When appropriate, data can be transferred from a queue to a network interface for delivery to an access point. For example, data from higher priority queue 245H or 246H can be transferred to network interface 231 or 232 respectively for delivery to access point 205. A sequence of three periods (i.e., an ellipsis) between queues indicates that one or more other queues of appropriate priorities can be situated between the expressly depicted queues in network architecture 200. For example, a queue of a higher priority than lower priority queue 246L and of lower priority that medium priority queue 246M can be situated between lower priority queue 246L and medium priority queue 246M.

Other stations in network architecture 200, such as, for example, station 213, may not be capable of classifying data based on the type of the data. For example, when applications 213 has data to send to access point 205 the data may be transferred directly to network interface 233. Accordingly, within network architecture 200, there may be a one or more data classification enabled stations as well as potentially other stations that are not capable of classifying data. Each of the stations can communicate with access point 205 over common wireless link 282.

Figure 3:
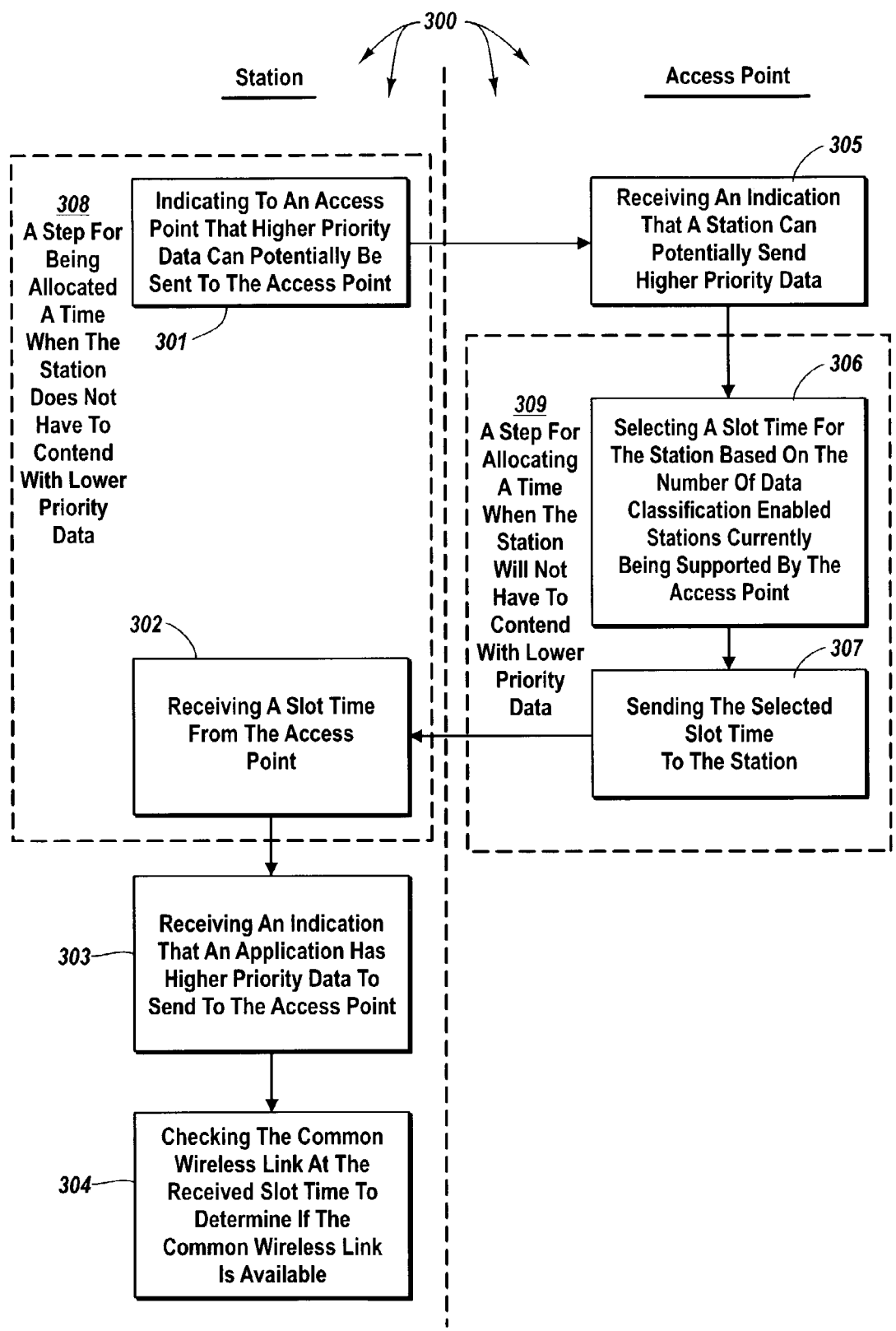
FIG. 3 illustrates an example flowchart of a method for providing contention free quality of service to higher priority data in accordance with the principles of the present invention.

FIG. 3 illustrates an example flowchart of a method 300 for providing contention free quality of service to higher priority data in accordance with the principles of the present invention. The method 300 will be discussed with respect to the stations and access point depicted in network architecture 200.

The method 300 includes a functional, result-oriented step for being allocated a time when the station does have to contend with lower priority data (step 308). Step 308 can include any corresponding acts for being allocated a time when the station does have to contend with lower priority data. However, in the illustrated example of FIG. 3, step 308 includes an act of indicating to an access point that higher priority data can potentially be sent to the access point (act 301). Act 301 can include a station computer system indicating to an access point computer system that the station computer system can potentially send higher priority data over a common wireless link to the access point computer system.

For example, station 211 (or station 212) can indicate to access point 205 that station 211 (or station 212) can potentially send higher priority data over common wireless link 282 to access point 205. Higher priority data can be data that has been classified as having more restrictive time constraints (as compared to other lower priority data). Accordingly, any station that is configured to classify data may indicate that it can potentially send higher priority data to the access point.

The method 300 includes an act of receiving an indication that a station can potentially send higher priority data (act 305). Act 305 can include an access point computer system receiving an indication that a station computer system can potentially send higher priority data over the common wireless link to the access point computer system. For example, access point 205 can receive an indication that station 211 (or station 212) can potentially send higher priority data over common wireless link 282 to access point 205.

The method 300 includes a functional, result-oriented step for allocating a time when the station does not have to contend with lower priority data (step 309). Step 309 can include any corresponding acts for allocating a time when the station does not have to contend with lower priority data. However, in the illustrated example of FIG. 3, step 309 includes a corresponding act of selecting a slot time for the station based on the number of data classification enabled stations already being supported by the access point (act 306). Act 306 can include an access point computer system selecting a slot time based on the number of data classification enabled station computer systems already being supported by the access point computer system. For example, access point 205 can select a slot time for station 211 or station 212 based on the number of other data classification enabled stations (not shown) currently being supported by access point 205.

A slot time represents a fixed time when a station computer system can check for access to a common wireless link without having to contend with lower priority data from other station computer systems. A slot time can be a multiple of a time interval time that is calculated based on the number of data classification enabled stations that can be supported by an access point and the time interval between the end of a short inter frame space ("SIFS") and the beginning of a contention window. For example, briefly referring to FIG. 4, time interval 452 represents an example of such a time interval. A fixed time can be set equal to the quotient of the time interval divided by the number of supported data classification enabled stations. For example, if an access point can support five data classification enabled stations and there is a time interval of 30 milliseconds, a fixed time would equal 6 milliseconds.

Accordingly, a first station to indicate that higher priority data is to be sent to the access point may be assigned a slot time equal to the product of one multiplied by the time interval that can be a function of the maximum one-way propagation delay between two stations that are farthest apart. A second station to indicate that higher priority data is to be sent to the access point may be assigned a slot time equal to the product of two multiplied by the time interval. Subsequent, stations can be assigned increasing multiples of the time interval, such as, for example, 3, 4, 5, etc., up to the number of supported data classification enabled stations. Accordingly, slot times can be assigned such that every assigned slot time occurs before any contention window corresponding to lower priory data occurs. A station can re-assign slot times based on changed network conditions or when higher priority data from a particular station is to be given preferred access to a common wireless link.

Step 309 also includes a corresponding act of sending the selected slot time to the station (act 307). Act 307 can include an access point computer system sending the selected slot time to a station computer system. For example, access point 205 can send a selected slot time to station 211 or station 212. Access point 205 can from time to time send a beacon packet to the stations that are connected to access point 205. The beacon packet can include the slot time corresponding to each data classification enabled stations currently being supported by access point 205.

Step 308 includes a corresponding act of receiving a slot time from the access point (act 302). Act 302 can include a station computer system receiving a slot time from an access point computer system. For example, station 211 or station 212 can receive a slot time from access point 205. A slot time can be received in a beacon packet that was sent from an access point. For example, station 211 can receive a slot time in a beacon packet sent from access point 205. The beacon packet can include slot times for each of the data classification enabled stations currently being supported by access point 205. Station 211 can identify its corresponding slot time from within the beacon packet. Station 211 can configure network interface 231 to check for access to common wireless link 282 at the identified slot time when station 211 has higher priority data to send.

The method 300 includes an act of receiving an indication that an application has higher priority data to send to the access point (act 303). Act 303 can include a station computer system receiving an indication that an application has higher priority data to send to the access point computer system. For example, classification module 242 can receive one or more data packets from applications 222. Classification module 242 can classify the data contained in the data packets (e.g., based on the detected packet type) as data having more restrictive time constraints (e.g., voice over IP data). Accordingly, classification module 242 can assign the data to higher priority queue 246H.

The method 300 includes an act of checking the common wireless link at the received time slot to determine if the common wireless link is available (act 304). Act 304 can include a station computer system checking a common wireless link at the received slot time to determine if the common wireless link is available. For example, station 212 can check common wireless link 282 at a received slot time to determine if common wireless link 282 is available. If common wireless link 282 is available at the receive slot time, station 212 can immediately transfer data to access point 205. Since the slot time is essentially guaranteed to occur before any contention windows corresponding to lower priority data, there is an increased chance of the higher priority data being given access to the common wireless link. On the other hand, if common wireless link 282 is not available at the received slot time, station 212 does not send data. Common wireless link 282 may be in use when a station with a previous slot time is sending higher priority data.

Figure 4:
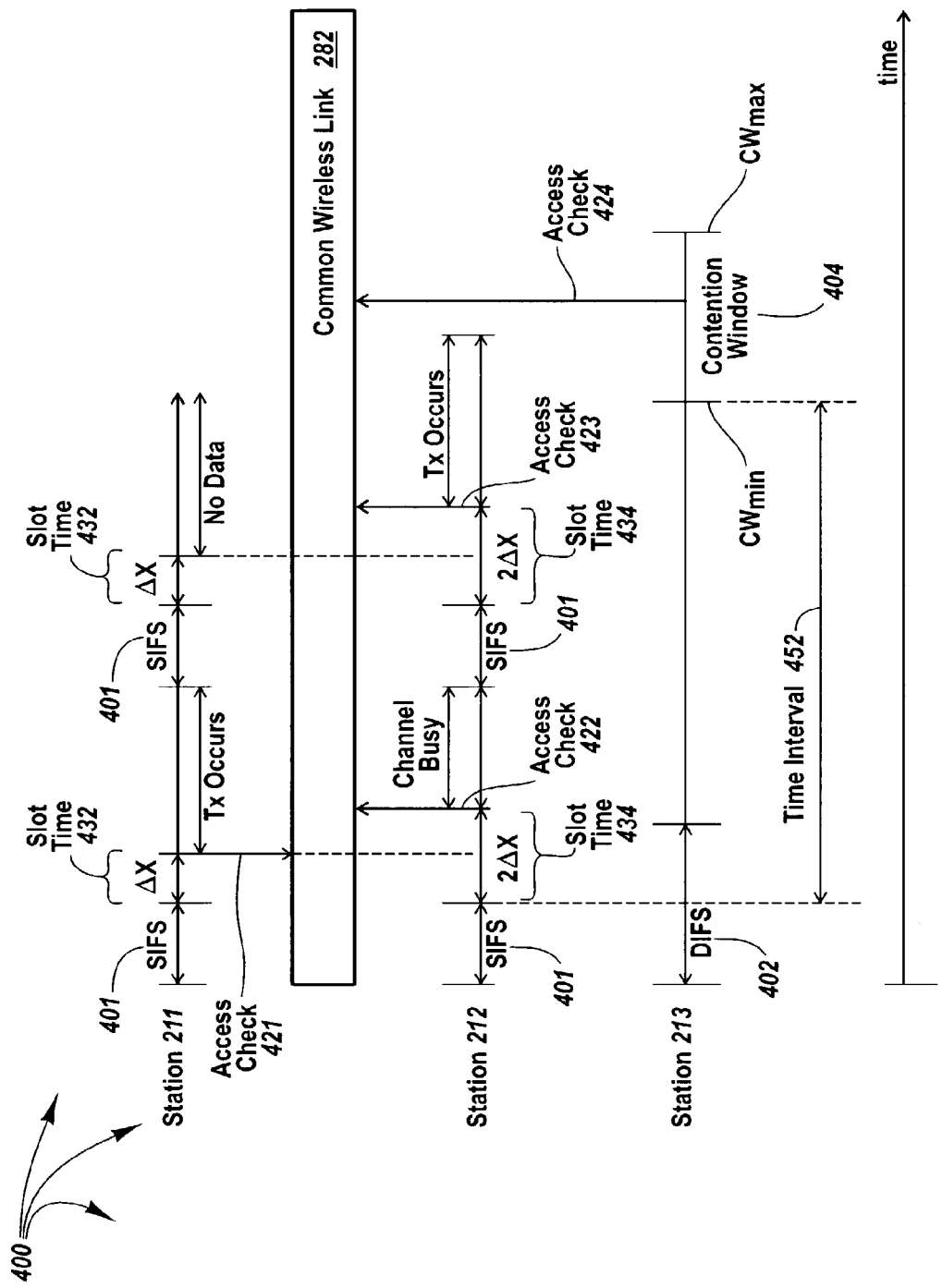
FIG. 4 is an example timing diagram that illustrates stations checking for access to a common wireless link in accordance with the principles of the present invention

FIG. 4 is an example timing diagram 400 that illustrates stations checking for access to a common wireless link in accordance with the principles of the present invention. Timing diagram 400 depicts stations 211, 212 and 213 checking for access to common wireless link 282 (e.g., an IEEE 802.11 channel). Station 211 and station 212 (which are data classification enabled stations) have each been assigned slot times (e.g., by access point 205). Station 211 has been assigned slot time 432 and station 212 has been assigned slot time 434. Slot time 232, as represented by "ΔX", is equal to the product of one multiplied by a time interval (e.g., as calculated from the number of data classification enabled stations supported by access point 205 and the time interval 452). Slot time 43, as represented by "2ΔX", is equal to the product of two multiplied by the time interval.

When station 211 has higher priority data to send, station 211 can check for access to common wireless link 282 after a period of time equal to the sum of SIFS 401 (16 microseconds for IEEE 802.11a) plus slot time 432. For example, as depicted by access check 421, station 211 checks for access to common wireless link 282. When access to common wireless link 282 is available, station 211 can transmit data, as represented by the text "TX Occurs".

When station 212 has higher priority data, station 212 can check for access to common wireless link 282 after a period of time equal to the sum of SIFS 401 plus slot time 434. For example, as depicted by access check 422, station 212 checks for access to common wireless link 282. However, since station 211 (a station with a previous slot time) is already transmitting data, access check 422 will detect that common wireless access link 282 is not available, as represent by the text "Channel Busy". Accordingly, station 212 will defer the transmission of the higher priority data to a later time After station 211's data transmission is complete, common wireless link 282 again becomes available. Since station 211 has completed transmission (and thus potentially has no other higher priority data), station 211 does not immediately check for access to common wireless link 282. Thus, after a period of time equal to the sum of SIFS 401 plus slot time 432, common wireless link 282 may still be available, as represented by the text "No Data".

Accordingly, if station 212 has higher priority data, station 212 can check for access to common wireless link 282 after a period of time equal to the sum of SIFS 401 plus slot time 434. As depicted by access check 423, station 212 checks for access to common wireless link 282. Since station 211 is not transmitting higher priority data, common wireless link 282 is available. Accordingly, station 212 can transmit data, as represented by the text "TX Occurs".

Station 213, which does not support data classification, waits at least an amount of time equal to the sum of Distributed Coordination Function Inter Frame Space ("DIFS") 402 (34 microseconds for IEEE 802.11a) plus $CW_{min}$. Station 213 can also wait an additional random amount of time within contention window 404. After the additional random amount of time, station 213 can perform access check 424. In the example timing diagram 400, access check 424 detects that common wireless link 282 is available. However, it may be that other stations have higher priority data and at the time access check 424 is performed common wireless link 282 is detected as busy. Thus, if other stations had other higher priority data, the other priority data could also be transferred before station 213 performs access check 424. Accordingly, higher priority does not have to contend with lower priority data for access to common wireless link 282. Although station 213 is depicted as waiting for DIFS 402, DIFS 402 could be replaced by any other type of inter frame space, such as, for example, an Arbitration Inter Frame Space ("AIFS") (at least 34 microseconds for IEEE 802.11a), a Point Coordination Function Inter Frame Space ("PIFS") (25 microseconds for 802.11a), or even SIFS 401.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by united states Letters Patent is:

1. In a station computer system that is network connectable, along with one or more other station computer systems, to an access point computer system over a common wireless link, the station computer system and the one or more other station computer systems being configured to exchange data packets with the access point computer system over the common wireless link, the data packets potentially including higher priority data having a higher priority than other lower priority data of a lower priority, a method for providing higher priority data contention free access to the common wireless link, the method comprising:

an act of indicating to the access point computer system that the station computer system can potentially send higher priority data over the common wireless link to the access point computer system;

an act of receiving a slot time from the access point computer system, the slot time selected based at least in part on the time interval between the end of a Short Inter Frame Space and the beginning of a contention window utilized by lower priority data, the slot time being a multiple of a time interval that was calculated based at least in part on the number of data classification enabled stations supported by the access point computer system, the slot time representing a fixed time when the station computer system can check for access to the common wireless link such that the station computer system does not have to contend with lower priority data;

an act of receiving an indication from an application that higher priority data is to be sent to the access point computer system; and an act of checking the common wireless link at the slot time to determine if the common wireless link is available.

2. The method as recited in claim 1, wherein the act of receiving a slot time from the access point computer system comprises an act of receiving a data packet from the station computer system that includes the slot time.

3. The method as recited in claim 2, wherein the act of receiving a data packet from the station computer system that includes the slot time comprises an act of receiving a beacon packet.

4. The method as recited in claim 1, wherein the act of receiving a slot time from the access point comprises an act of receiving a slot time that will cause the station to wait the sum of a Short Inter Frame Space plus a multiple of the time interval for access to the common wireless link.

5. The method as recited in claim 1, wherein the act of receiving an indication from an application that higher priority data is to be sent to the access point computer system comprises an act of detecting that the packet type associated with the data corresponds to higher priority data.

6. The method as recited in claim 1, wherein the act of receiving an indication from an application that higher priority data is to be sent to the access point computer system comprises an act of receiving an indication that data has more restrictive time constraints.

7. The method as recited in claim 6, wherein the act of receiving an indication that data has more restrictive time constraints comprises an act of receiving an indication of voice over IP data.

8. The method as recited in claim 6, wherein the act of receiving an indication that data has more restrictive time constraints comprises an act of receiving an indication of streaming audio/or video data.

9. The method as recited in claim 1, wherein the act of receiving an indication from an application that higher priority data is to be sent to the access point computer system comprises an act of receiving an indication from a data classification module.

10. The method as recited in claim 1, wherein the act of receiving an indication from an application that higher priority data is to be sent to the access point computer system comprises an act of transferring the higher priority data to a higher priority queue.

11. The method as recited in claim 1, wherein an act of checking the common wireless link at the slot time to determine if the common wireless link is available comprises an act of detecting that the common wireless link is available.

12. The method as recited in claim 11, further comprising:
an act of initiating transmission of the higher priority data to the access point computer system in response to detecting that the common wireless link is available.

13. The method as recited in claim 1, wherein an act of checking the common wireless link at the slot time to determine if the common wireless link is not available comprises an act of detecting that the common wireless link is busy.

14. The method as recited in claim 13, further comprising:
an act of deferring transmission of the higher priority data to the access point computer system in response to detecting that the common wireless link is not available.

15. In an access point computer system that is network connectable to a plurality of station computer systems over a common wireless link, the access point computer system being configured to exchange data packets with each of the plurality of station computer systems over the common wireless link, the data packets potentially including higher priority data having a higher priority than other lower priority data of a lower priority, a method for providing higher priority data contention free access to the common wireless link, the method comprising:

an act of receiving an indication that a station computer system can potentially send higher priority data over the common wireless link to the access point computer system;

an act of calculating a time interval based at least in part on the time interval between the end of a Short Inter Frame Space and the beginning of a contention window utilized by lower priority data;

an act of selecting a slot time for the station computer system based on the number of other data classification enabled stations currently being supported by the access point computer system, the slot time being a multiple of the time interval and representing a fixed time when the station computer system can check for access to the common wireless link without having to contend with lower priority data from other station computer systems; and an act of sending the selected slot time to the station computer system.

16. The method as recited in claim 15, further comprising:
an act of calculating the time interval based at least in part on the number of data classification enabled stations that can be supported by the access point computer system.

17. The method as recited in claim 15, wherein the an act of selecting a slot time for the station computer system comprises an act of selecting a slot time based on the number of other stations that have already been assigned slot times.

18. The method as recited in claim 15, wherein the act of selecting a slot time for the station computer system comprises an act of selecting a slot time that will cause the station computer system to wait the sum of a Short Inter Frame Space plus a multiple of the time interval before checking for access to the common wireless link.

19. The method as recited in claim 15, wherein the act of sending the selected slot time to the station computer system comprises an act of sending a data packet that includes the slot time.

20. The method as recited in claim 19, wherein the act of sending a data packet that includes the slot time comprises an act of sending a beacon packet.

21. A computer program product for use in a station computer system that is network connectable, along with one or more other station computer systems, to an access point computer system over a common wireless link, the station computer system and the one or more other station computer systems being configured to exchange data packets with the access point computer system over the common wireless link, the data packets potentially including higher priority data having a higher priority than other lower priority data of a lower priority, the computer program product for implementing a method for providing higher priority data contention free access to the common wireless link, the computer program product comprising one or more computer-readable media having stored thereon computer executable instructions that, when executed by a processor, cause the station computer system to perform the following:
  indicate to the access point computer system that the station computer system can potentially send higher priority data over the common wireless link to the access point computer system;
  receive a slot time from the access point computer system, the slot time selected based at least in part on the time interval between the end of a Short Inter Frame Space and the beginning of a contention window utilized by lower priority data, the slot time being a multiple of a time interval that was calculated based at least in part on the number of data classification enabled stations supported by the access point computer system, the slot time representing a fixed time when the station computer system can check for access to the common wireless link such that the station computer system does not have to contend with lower priority data;
  receive an indication from an application that higher priority data is to be sent to the access point computer system; and
  check the common wireless link at the slot time to determine if the common wireless link is available.

22. The computer program product as recited in claim 21, wherein the one or more computer-readable media are physical media.

23. The computer program product as recited in claim 21, wherein the one or more computer-readable media include system memory.

24. A computer program product for use in an access point computer system that is network connectable to a plurality of station computer systems over a common wireless link, the access point computer system being configured to exchange data packets with each of the plurality of station computer systems over the common wireless link, the data packets potentially including higher priority data having a higher priority than other lower priority data of a lower priority, the computer program product for implementing a method for providing higher priority data contention free access to the common wireless link, the computer program product comprising one or more computer-readable media having stored thereon computer executable instructions that, when executed by a processor, cause the access point computer system to perform the following:
  receive an indication that a station point computer system can potentially send higher priority data over the common wireless link to the access point computer system;
  calculate the time interval based on the number of data classification enabled stations that can be supported by the access point computer system and the time interval between the end of a Short Inter Frame Space and the beginning of a contention window utilized by lower priority data;
  select a slot time for the station computer system based on the number of other data classification enabled stations currently being supported by the access point computer system, the slot time being a multiple of the time interval and representing a fixed time when the station computer system can check for access to the common wireless link without having to contend with lower priority data from other station computer systems; and
  send the selected slot time to the station computer system.

25. The computer program product as recited in claim 24, wherein the one or more computer-readable media are physical media.

26. The computer program product as recited in claim 24, wherein the one or more computer-readable media include system memory.

27. In a station computer system that is network connectable, along with one or more other station computer systems, to an access point computer system over a common wireless link, the station computer system and the one or more other station computer systems being configured to exchange data packets with the access point computer system over the common wireless link, the data packets potentially including higher priority data having a higher priority than other lower priority data of a lower priority, a method for providing higher priority data contention free access to the common wireless link, the method comprising:
  an act of indicating to the access point computer system that the station computer system can potentially send higher priority data over the common wireless link to the access point computer system;
  an act of receiving a slot time from the access point computer system, the slot time being a multiple of a time interval that was calculated based at least in part on the number of data classification enabled stations supported by the access point computer system, the slot time configured to cause the station to wait the sum of a Short Inter Frame Space plus a multiple of the time interval for access to the common wireless link, the slot time representing a fixed time when the station computer system can check for access to the common wireless link such that the station computer system does not have to contend with lower priority data;
  an act of receiving an indication from an application that higher priority data is to be sent to the access point computer system; and
  an act of checking the common wireless link at the slot time to determine if the common wireless link is available.

28. The method as recited in claim 27, wherein the act of receiving a data packet from the station computer system that includes the slot time comprises an act of receiving a beacon packet.

29. The method as recited in claim 27, wherein the act of receiving an indication from an application that higher priority data is to be sent to the access point computer system comprises an act of detecting that the packet type associated with the data corresponds to higher priority data.

30. The method as recited in claim 27, wherein the act of receiving an indication from an application that higher priority data is to be sent to the access point computer system comprises an act of receiving an indication that the data has more restrictive time constraints.

31. In an access point computer system that is network connectable to a plurality of station computer systems over a common wireless link, the access point computer system being configured to exchange data packets with each of the plurality of station computer systems over the common wireless link, the data packets potentially including higher priority data having a higher priority than other lower priority data of a lower priority, a method for providing higher priority data contention free access to the common wireless link, the method comprising:

an act of receiving an indication that a station computer system can potentially send higher priority data over the common wireless link to the access point computer system;

an act of selecting a slot time for the station computer system based on the number of other data classification enabled stations currently being supported by the access point computer system, the slot time being a multiple of a time interval and representing a fixed time when the station computer system can check for access to the common wireless link without having to contend with lower priority data from other station computer systems, the slot time configured to cause the station computer system to wait the sum of a Short Inter Frame Space plus a multiple of the time interval before checking for access to the common wireless link; and an act of sending the selected slot time to the station computer system.

* * * * *